United States Patent [19]

Tomishima et al.

[11] 4,455,413

[45] Jun. 19, 1984

[54] METHOD FOR SUPPRESSING BUBBLING IN POLYMERIZATION OF VINYL CHLORIDE RESIN

[75] Inventors: Yoshio Tomishima, Kobe; Teiji Kobayashi; Hiroshi Shibahara, both of Takasago; Yasuhiro Nojima, Akashi, all of Japan

[73] Assignee: Kanegafuchi Kagaku Kogyo Kabushiki Kaisha, Osaka, Japan

[21] Appl. No.: 390,845

[22] Filed: Jun. 22, 1982

[30] Foreign Application Priority Data

Jun. 22, 1981 [JP]  Japan .................................. 56-97273
Jun. 22, 1981 [JP]  Japan .................................. 56-97274

[51] Int. Cl.³ ............................................. C08F 2/18
[52] U.S. Cl. .................................................. 526/344.2
[58] Field of Search ...................................... 526/344.2

[56] References Cited

U.S. PATENT DOCUMENTS 3,627,744 12/1971 Hopkins et al. ................. 526/344.2
3,926,931 12/1975 Koyanagi et al. ............... 526/344.2
3,957,744 5/1976 Deuschel et al. ................ 526/344.2

*Primary Examiner*—Paul R. Michl
*Attorney, Agent, or Firm*—Armstrong, Nikaido, Marmelstein & Kubovcik

[57] ABSTRACT

A method for production of vinyl chloride resin is provided, in which vinyl chloride or a monomeric mixture containing vinyl chloride as a major ingredient is polymerized, while controlling the operation of a reflux condenser provided at a polymerization vessel by supplying hot water or steam and then cooling water to the side of cooling water of the condenser, whereby bubbling is suppressed. The method provides outstanding advantages, such as, a high quality product improved with respect to fish eyes, high productivity, a shortened polymerization time, and a savings in steam for heating.

3 Claims, 1 Drawing Figure

METHOD FOR SUPPRESSING BUBBLING IN POLYMERIZATION OF VINYL CHLORIDE RESIN

BACKGROUND OF THE INVENTION

1. Field of the Invention

The present invention relates generally to an improved method for preparing vinyl chloride resin by suspension polymerization using a polymerization vessel equipped with a reflux condenser, more particularly, to a production method of vinyl chloride resin by effecting suspension polymerization while suppressing bubbling by control of an amount supplied of cooling water and hot water or steam into the reflux condenser.

2. Description of Prior Art

In the production of vinyl chloride resin a condenser has been often used in respect of safety as well as an increase in productivity. In the suspension polymerization, however, with operation of a condenser vigorous bubbling phenomenon occurs in the polymerization system and at the beginning of polymerization, in particular, foam of a suspending agent containing an initiator adheres to a gaseous portion of a polymerization vessel, inside walls of a conduit and the condenser to thus form polymer scales.

The polymer scales thus formed not only reduce the efficiency of heat transfer and invite undesired results in respect of particle size distribution, fish eyes and the like, but a great deal of labor and difficulties are necessitated for removal of the scales. Moreover, even after the middle stage of polymerization an agitating effect lowers with an increase in viscosity of a polymerized suspension liquid and hence hold-up of the suspension liquid increases concurrently with ascending of the bubbles generated.

In extreme some instances, a mixture containing monomer enters the conduit and the inside of the condenser and further polymerizes, without being mixed with the suspension liquid, to form masses of scales at that place, through which it become difficult to operate the condenser regularly and qualities of product are also deteriorated.

That is, in order to achieve stable operation of the polymerization it is necessary to prevent the suspension liquid attended by the bubbles from intruding into the condenser over an entire period of polymerization time, and to carry out the polymerization while decreasing an amount of suspension liquid to be charged into the polymerization vessel.

SUMMARY OF THE INVENTION

It is therefore an object of the present invention to provide a method for production of vinyl chloride resin using a polymerization vessel equipped with a reflux condenser.

It is another object of the present invention to provide a method for production of vinyl chloride resin in which the polymerization is carried out while adjusting an amount supplied of cooling water and hot water or steam to the reflux condenser provided at the polymerization vessel.

It is a further object of the present invention to provide a method for production of vinyl chloride resin that in and after the middle stage of the polymerization the polymerization temperature is gradually raised to thereby suppress bubbling in the vessel.

It is a still further object of the present invention to provide a method for production of vinyl chloride resin which is capable of increasing a charging amount, in consequence, productivity, saving energy and obtaining high quality polymer product.

Those and other objects of the present invention together with advantages thereof will become apparent to those skilled in the art from the detailed disclosure of the present invention as set forth hereinbelow.

The present invention has been completed, after a series of studies by the present inventors to eliminate the foregoing drawbacks, on the discovery that the polymerization can be effectively carried out while suppressing bubbling by the adjustment of supply amount of cooling water and hot water or steam.

DETAILED DESCRIPTION OF THE INVENTION

Figure 1:
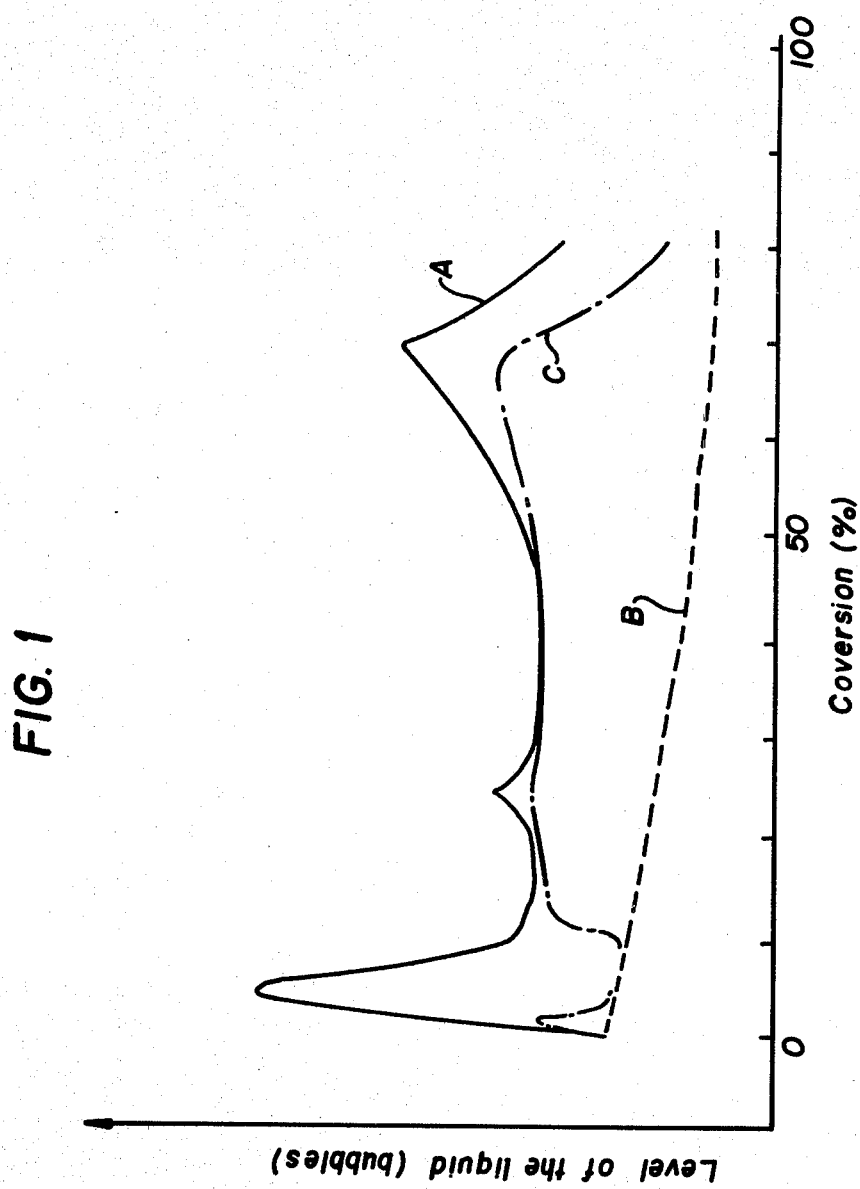
FIG. 1 is a graph showing a change in level of a suspension liquid (bubbles).

Hereinbelow, the present invention will be explained in detail.

FIG. 1 illustrates a typical example of showing the level of the suspension liquid (bubbles) observed during the course of the polymerization.

When the condenser is not used, the level of liquid (bubbles) is reduced with the progress of the polymerization, as shown by a dotted line B, due to shrinkage of the volume. On the other hand, in the event that the polymerization is effected while keeping an amount of heat removed by the condenser constant, vigorous bubbling takes place, as depicted by a solid line A, owing to a layer of bubbles mainly comprising a free suspending agent and, before long, it becomes weak and disappears with the advancement of the polymerization. Inversely, it is possible to repress such a violent bubbling in the initial stage of polymerization, as illustrated by a dashed line C, by supplying, prior to polymerization, hot water or steam into the cooling water side of the condenser to thus hold the temperature of the cooling water side higher than that of the polymerization, then allowing the polymerization to start, thereafter cooling water is commenced to be passed therethrough.

Moreover, in and after the middle stage of polymerization, hold-up of the suspension liquid increases again because an agitating effect lowers as the viscosity of the suspension liquid rises, but bubbling is repressed, as exhibited by C, by reduction or stoppage of supplying of cooling water to the condenser to thereby decrease an amount of monomer evaporated.

Furthermore, though bubbling phenomenon not only becomes prominent increasingly, but removal of reaction heat generated becomes difficult with the scale-up of the polymerization vessel, the present invention makes it possible to carry out the polymerization while suppressing bubbling in and after middle stage of polymerization by the adjustment of the removed amount of heat of the condenser with gradual elevation of the polymerization temperature, and hence a charging amount of reactants is not only enhanced, but conversion is raised, thus resulting in an increase in productivity. Besides those, heat of reaction is utilized to heat the suspension liquid so that an amount of steam for heating can be saved as a secondary effect.

Incidentally the greater the ratio of monomer to water charged into the vessel becomes, the better in respect of productivity. However, at a conversion between about 25% and about 30% the viscosity of the suspension liquid goes up rapidly to make it difficult to operate the agitator and it is therefore preferred to decrease the viscosity of the suspension liquid by adding, during the course of polymerization, water in an amount less than that which corresponds to the shrinkage of volume caused by the polymerization.

As a monomer used in the present invention, there is included vinyl chloride or a mixture of vinyl-series monomers mainly containing vinyl chloride, said vinyl-series monomers being exemplified by olefines such as ethylene and propylene; vinyl esters such as vinyl acetate and vinyl stearate; esters of acrylic acid such as methyl acrylate and methyl methacrylate; esters or anhydrides of acids such as maleic acid and fumaric acid; nitrilic compounds such as acrylonitrile; vinylidene compounds such as vinylidene chloride.

As an initiator used in the present invention, there are included initiators normally used for the suspension polymerization of vinyl chloride, including organic peroxides such as lauroyl peroxide, 3,5,5-trimethylhexanoyl peroxide, tertiary butylperoxypivalate, diisopropyl-peroxydicarbonate, di-2-ethylhexylperoxydicarbonate and acetylcyclohexylsulfonyl peroxide, and compounds such as $\alpha,\alpha'$-azobisisobutylonitrile and $\alpha,\alpha'$-azobis-2,4-dimethylvaleronitrile. These are used singly or in conjunction with two or more.

As a suspending agent used in the present invention, any known suspending agent may be used including such as partially saponified polyvinyl alcohol, a copolymer of vinyl acetate and maleic anhydride, a copolymer of styrene and maleic anhydride, polyvinyl pyrrolidone and methyl cellulose and the like.

The polymerization temperature in the present invention is normally in a range between 40° C. and 75° C. and an increase in the polymerization temperature in the middle stage of polymerization ranges normally from about 5° C. to about 20° C., but not limited thereto, in particular.

According to the present invention, in the suspension polymerization of vinyl chloride using a polymerization vessel provided with a reflux condenser, a charging amount can be increased preventing the suspension liquid from entering conduits and the inside of the condenser, in consequence, polymer scales deposition inside the conduits and the condenser is prohibited with a result that no problems on the qualities such as fish eyes occur.

In addition, productivity is drastically enhanced besides shortening of the polymerization time and steam for heating is saved, which are of great value in industry.

Hereinbelow, the present invention will be explained in more detail by way of examples that follow, which should not be construed as limiting the scope of the present invention.

EXAMPLE 1

Into a shell side of a stainless steel condenser of a shell and tube type having a heat transfer area of 5 m² provided at a 1.5 m³ polymerization vessel, hot water heated to 70° C. was introduced, thereafter 705 Kg of deionized water, 860 g of di-2-ethylhexylperoxy dicarbonate and 13.5 l of a 3% aqueous solution containing partially saponified polyvinyl alcohol were charged into the vessel. The vessel was subjected to deaeration for 15 minutes while an agitator was operating, 600 Kg of vinyl chloride were charged and the vessel was heated up to 58° C. to thereby commence the polymerization. When the conversion reached about 3%, cooling water was begun to be passed through the condenser and an amount of cooling water was increased gradually in a manner such that an amount of heat removed by the condenser after 30th minute might be approximately 50,000 Kcal/hr. At the time the conversion arrived at about 55%, the supply of cooling water into the condenser was stopped and the polymerization was continued at 58° C. When the pressure dropped to 8.4 Kg/cm²G, unreacted monomer was recovered to thus terminate the polymerization. During the operation of the agitator deionized water was continuously added at a rate of 300 ml/min.

In the foregoing fashion the polymerization was repeated batchwise 10 times and the conduit and the condenser were inspected, but no scales formation was observed inside thereof. Moreover the quality of the product obtained by 10th batch polymerization was given in Table 1.

EXAMPLE 2

Using the same apparatus as in Example 1, after supplying hot water heated up to 80° C. into the condenser, 635 Kg of deionized water, 325 g of di-2-ethylhexyl peroxydicarbonate and 12.2 l of a 3% aqueous solution containing partially saponified polyvinyl alcohol were introduced into the polymerization vessel. The vessel was deaerated, while being agitated, for 15 minutes, 540 Kg of vinyl chloride were charged into the vessel, then heated to 58° C. to initiate the polymerization. At the conversion of about 3%, the passage of cooling water through the condenser was commenced, an amount of cooling water being raised increasingly in such a way that an amount of heat removed by the condenser might be approximately 50,000 Kcal/hr. after minutes passed since the commencement of supply of cooling water, thereby the polymerization being continued at 58° C. When the pressure lowered to 8.4 Kg/cm²G, recovery of unreacted monomer was started to thus terminate the polymerization. While the agitator was operating, deionized water was added continuously at a rate of 300 ml/min.

After repeated 10-batch polymerization in the same fashion as aforesaid, no scales formation could be seen on the inner surfaces of the conduit and the condenser. The obtained results on the quality of the product prepared by 10th batch polymerization were shown in Table 1.

EXAMPLE 3

After supplying hot water heated to 60° C. into the condenser employed in Example 1, 705 Kg of deionized water, 220 g of di-2-ethylhexylperoxydicarbonate and 13.5 l of a 3% aqueous solution containing partially saponified polyvinyl alcohol were charged into the polymerization vessel and then the vessel was deaerated for 15 minutes while being agitated. Thereafter, 600 Kg of vinyl chloride were charged and the vessel was heated to 52° C., thus polymerization being started. Upon the conversion of about 8%, cooling water was started to be supplied into the condenser and an amount thereof was adjusted so that heat in an amount of 30,000 Kcal/hr. might be removed by the condenser. When 6 hours passed, an amount of cooling water supplied into the condenser was reduced gradually the polymerization was further continued at 52° C. After the polymerization for 8.5 hours, unreacted monomer was recovered to thus terminate the polymerization. During the operation of the agitator, water at a rate of 150 ml/min. was added continuously.

After the polymerization was batchwise repeated 10 times, no polymer scales deposited on the inside surfaces of the conduit and the condenser. The quality of the product obtained by the 10-batch polymerization was provided in Table 1.

EXAMPLE 4

Hot water heated to 70° C. was supplied into the same condenser provided at the same polymerization vessel as used in Example 1, then 705 Kg of deionized water, 360 g of di-2-ethylhexylperoxydicarbonate and 13.5 l of a 3% aqueous solution in which partialy saponified polyvinyl alcohol was contained were introduced into the vessel. The vessel was subjected to deaeration, while being agitated, for 15 minutes, then 600 Kg of vinyl chloride were charged and the vessel was heated to 58° C., at which vinyl chloride was polymerized. At the conversion of 5% the supply of cooling water into the condenser was commenced, then an amount thereof being increased gradually so that an amount of heat removed by the condenser after 30 minutes might be approximately 50,000 Kcal/hr., and the polymerization being thus continued. After the polymerization for 3 hours, the supply of cooling water was stopped and the polymerization was further continued while permitting the polymerization temperature to gradually rise.

At the fourth hour the polymerization temperature arrived at 75° C. where unreacted monomer was recovered to thereby terminate the polymerization. While the agitator was in operation, continuous addition of water was made at a rate of 300 ml/min. After the polymerization, there were no scales deposited on the interior surfaces of the conduit and the condenser. The conversion was 83%.

EXAMPLE 5

Into a shell side of a stainless steel reflux condenser with a heat transfer area of 50 $m^2$, with which a 10 $m^3$ polymerization vessel was equipped, hot water heated to 80° C. was supplied, then 4,300 Kg of deionized water, 2.2 Kg of di-2-ethylhexylperoxydicarbonate and 80 l of a 3% aqueous solution containing partially saponified polyvinyl alcohol were charged into the vessel. Deaeration of the vessel was carried out for 15 minutes while an agitator was operating, then 3,600 Kg of vinyl chloride were charged and the vessel being heated up to 58° C., at which vinyl chloride was polymerized. At the time the conversion reached 3%, the supply of cooling water into the condenser was commenced and an amount thereof being increased gradually in such a manner that heat in an amount of about 200,000 Kcal/hr. might be removed after 30 minutes, whereby the polymerization was further continued.

At the third hour from the beginning of polymerization, an amount of cooling water into the condenser was slowly reduced to thereby allow the polymerization temperature to go up gradually, the polymerization being further continued.

At the fourth hour the polymerization temperature arrived at 73° C. and unreacted monomer was recovered to thus terminate the polymerization. During the operation of the agitator, water was continuously added at a rate of 2 l/min. In this way vinyl chloride was polymerized batchwise 10 times, but no scales formed on the inside surfaces of the conduit and the condenser. The obtained polymer exhibited a conversion of 83%.

EXAMPLE 6

After supplying hot water heated to 60° C. into the condenser as used in Example 4, 705 Kg of deionized water, 220 g of di-2-ethylhexylperoxydicarbonate and 13.5 l of a 3% aqueous solution containing partially saponified polyvinyl alcohol were charged into the polymerization vessel. The vessel was deaerated, while being stirred, for 15 minutes, then 600 Kg of vinyl chloride were charged and the vessel was heated up to 52° C., at which the polymerization was started. At a conversion of 8%, cooling water was begun to be supplied into the condenser and controlled so that an amount of heat removed by the condenser might be approximately 30,000 Kcal/hr. At the sixth hour from the commencement of polymerization, the supply of cooling water was stopped to thereby allow the polymerization temperature to rise gradually, and it arrived at 68° C. when 8.5 hours passed, at that time unreacted monomer was recovered to thus terminate the polymerization. While the agitator was operating, water was added at a rate of 150 ml/min. After the polymerization, polymer scales did not deposit on the inside surfaces of the conduit and the condenser. The conversion was 85%.

COMPARATIVE EXAMPLE 1

The same apparatus as used in Example 1 was employed. After supply of cooling water of 30° C. into the condenser, 635 Kg of deionized water, 320 g of di-2-ethylhexylperoxydicarbonate and 12.2 l of a 3% aqueous solution containing partially saponified polyvinyl alcohol were charged into the polymerization vessel. The vessel was deaerated for 15 minutes while the agitator was in operation, then 540 Kg of vinyl chloride were charged and the vessel being heated at 58° C. where the polymerization of vinyl chloride was started. Then the polymerization was further continued at 58° C., while controlling an amount of heat removed by the condenser to about 50,000 Kcal/hr. When the pressure dropped to 8.4 Kg/$cm^2$G, unreacted monomer was recovered and the polymerization was terminated. After repeated polymerization by 3 batches, there could be observed film-like polymer scales deposited on the inside surfaces of the conduit and the condenser.

COMPARATIVE EXAMPLE 2

Under the same conditions as in Example 4 vinyl chloride was polymerized. At a conversion of about 5%, the supply of cooling water into the condenser was started and an amount thereof being increased gradually. The polymerization was further continued at 58° C. while controlling an amount of heat removed by the condenser after 30th minute to approximately 50,000 Kcal/hr. and at fourth hour unreacted monomer was recovered to thereby terminate the polymerization. After polymerization, the condenser and the conduit were blocked with polymer overflowed. The conversion was 77%.

COMPARATIVE EXAMPLE 3

The polymerization was commenced under the same conditions as in Example 6. At the conversion of 8%, the supply of cooling water to the condenser was begun, then an amount thereof being gradually increased, and the polymerization was conducted at 52° C. while adjusting an amount of heat removed by the condenser to about 30,000 Kcal/hr. When 8.5 hours passed since the beginning of polymerization, unreacted monomer was recovered, thereby the polymerization being terminated. While the agitator was in operation, water was added continuously at a rate of 150 ml/min.

After polymerization, the overflowed polymer blocked the condenser and the conduit. The conversion was 78%.

wherein the polymerization is initiated by supplying, prior to polymerization, hot water or steam to the cooling water side of the reflux condenser so as to keep the temperature of the cooling water side higher than the polymerization temperature, allowing the polymerization to start, and thereafter passing cooling water through the cooling water side, whereby bubbling in the vessel is controlled at the initial stage of the polymerization.

TABLE 1

|  | Example | | | | | | Comparative Example | | |
|---|---|---|---|---|---|---|---|---|---|
|  | 1 | 2 | 3 | 4 | 5 | 6 | 1 | 2 | 3 |
| Prevention of bubbling at the initial stage | Done | Done | Done | Done | Done | Done | None | Done | Done |
| Prevention of bubbling at the final stage | Done | None | Done | Done | Done | Done | Done | None | None |
| Particle size distribution (%): 60-mesh on | 0.2 | 0.2 | 0.3 | 0.3 | 0.2 | 0.1 | 10.0 | 2.0 | 1.8 |
| 200-mesh passed | 0.8 | 1.0 | 1.2 | 0.9 | 0.6 | 1.3 | 0.5 | 0.5 | 1.3 |
| Apparent specific gravity (g/cc) | 0.484 | 0.495 | 0.485 | 0.503 | 0.523 | 0.480 | 0.467 | 0.482 | 0.476 |
| Fish eyes (number/100cm$^2$) | 5 | 30 | 32 | 21 | 35 | 12 | 170 | 45 | 59 |
| Deposition of polymer scales | No scales even after 10-batch polymerization | No scales even after 10-batch polymerization | No scales even after 10-batch polymerization | No scales after 1-batch polymerization | No scales even after 10-batch polymerization | No scales after 1-batch polymerization | Film-like scales after 3-batch polymerization | Scales after 1-batch polymerization | Scales after 1-batch polymerization |

What we claim is:

1. In a method for production of vinyl chloride resin by the suspension of polymerization of vinyl chloride or a monomeric mixture comprising vinyl chloride as a main ingredient and other monomers co-polymerizable therewith using a polymerization vessel equipped with a reflux condenser, the improvement which comprises carrying out the polymerization while adjusting the operation of the reflux condenser by passing hot water or steam and then cooling water through the side of cooling water of the reflux condenser, whereby bubbling in the vessel is suppressed, 2. The method of claim 1, wherein the polymerization is effected by adjusting the passage of cooling water through the side of cooling water of the reflux condenser, whereby bubbling is controlled in and after the middle stage of polymerization where bubbling takes place vigorously in the vessel.

3. The method of claim 1 or claim 2, wherein the polymerization is effected by gradually raising the polymerization temperature in and after the middle stage of polymerization where bubbling takes place vigorously in the vessel.

* * * * *